(12) United States Patent
Mataja et al.

(10) Patent No.: US 7,055,889 B2
(45) Date of Patent: Jun. 6, 2006

(54) TOY VEHICLES HAVING INTERCHANGEABLE BODY STYLES

(75) Inventors: Bata Mataja, Malibu, CA (US); David K. B. Lee, Glendale, CA (US)

(73) Assignee: The Best Automotive Toy Art Company (The B.A.T.A. Co.), Sun Valley, CA (US)

( * ) Notice: Subject to any disclaimer, the term of this patent is extended or adjusted under 35 U.S.C. 154(b) by 0 days.

(21) Appl. No.: 11/069,266

(22) Filed: Mar. 1, 2005

(65) Prior Publication Data

US 2005/0148274 A1    Jul. 7, 2005

Related U.S. Application Data

(63) Continuation of application No. 09/975,521, filed on Oct. 11, 2001, now Pat. No. 6,918,627.

(51) Int. Cl.
    *B62D 25/08*    (2006.01)
(52) U.S. Cl. ........................... 296/177; 446/470
(58) Field of Classification Search ............... 296/177, 296/35.3, 193.03, 193.04; 280/827, 828; 449/470, 471, 94
    See application file for complete search history.

(56) References Cited

U.S. PATENT DOCUMENTS

| 1,279,540 A | 9/1918 | Hams |
| 1,665,469 A | 4/1928 | Myers et al. |
| 1,830,310 A | 11/1931 | Apple |
| 2,973,220 A | 2/1961 | White |
| 3,036,857 A | 5/1962 | Douglas |
| 3,224,137 A | 12/1965 | Wright et al. |
| 3,791,662 A | 2/1974 | Glass et al. |
| 3,842,928 A | 10/1974 | Kishi |
| 3,902,739 A | 9/1975 | Kimura |
| 4,264,080 A | 4/1981 | Kassai |
| 4,361,338 A | 11/1982 | Kuchenbecker et al. |
| 4,422,685 A | 12/1983 | Bonfilio et al. |
| 4,560,022 A | 12/1985 | Kassai |
| 4,709,958 A | 12/1987 | Harrod |
| 4,842,326 A | 6/1989 | DiVito |
| 4,993,983 A | 2/1991 | Kurita et al. |
| 5,090,105 A | 2/1992 | DeRees |
| 5,193,879 A | 3/1993 | Chen |
| 5,301,997 A | 4/1994 | Cudden |
| 5,307,890 A | 5/1994 | Huang |
| 5,409,263 A | 4/1995 | Klawitter |
| 6,595,824 B1 | 7/2003 | Calello et al. |

FOREIGN PATENT DOCUMENTS

GB    2 207 096 A    1/1989

*Primary Examiner*—Joseph D. Pape
(74) *Attorney, Agent, or Firm*—Christie, Parker & Hale, LLP.

(57) ABSTRACT

A child-sized toy vehicle comprising a vehicle chassis upon which any number of a plurality of stylistically different interchangeable vehicle body modules may be removably secured. The various vehicle body module styles may be comprised of separate body module sections such as a front body module, a rear body module, a left side body module, and a right side body module. In addition, body modules from different body styles may be attached to the same vehicle chassis such that a hybrid vehicle is produced.

10 Claims, 18 Drawing Sheets

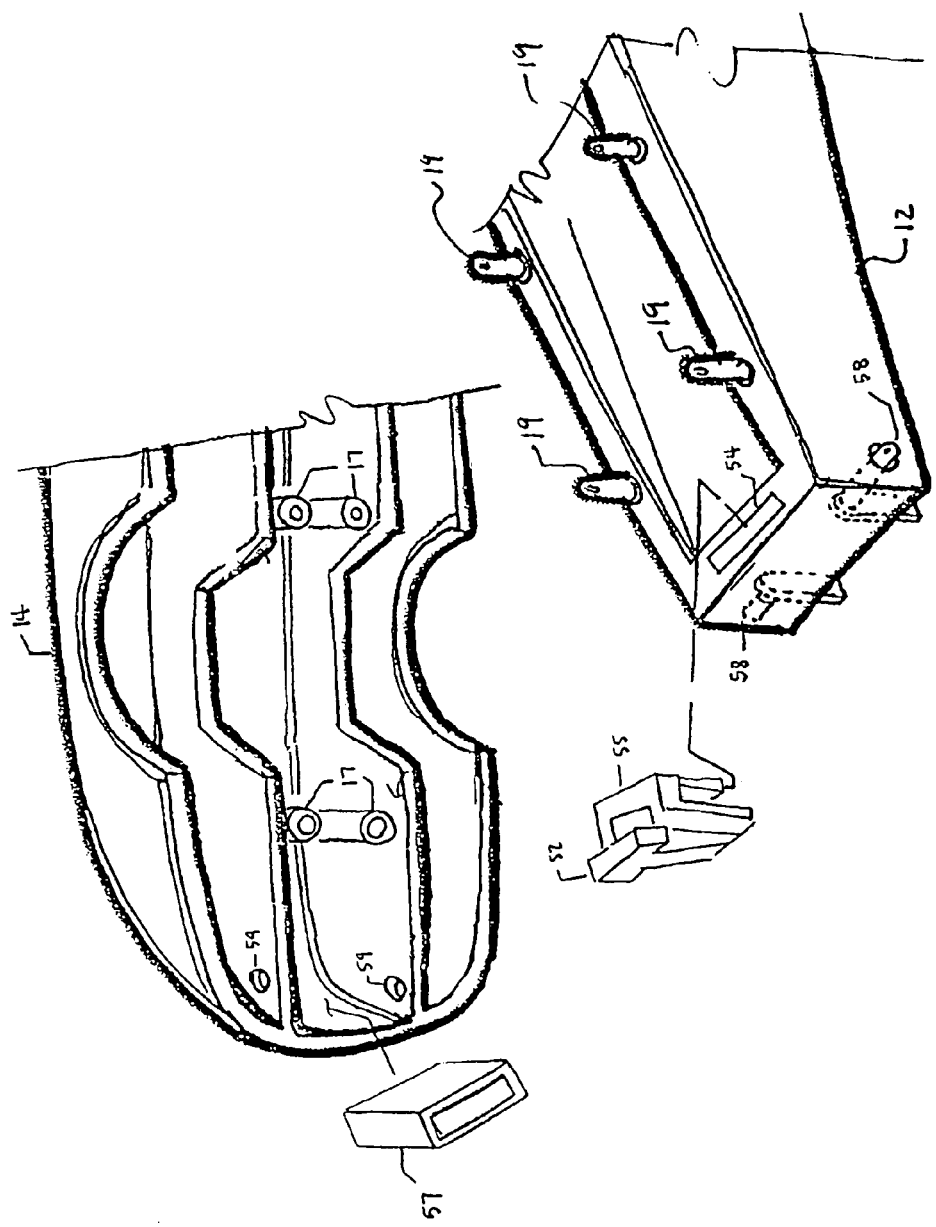

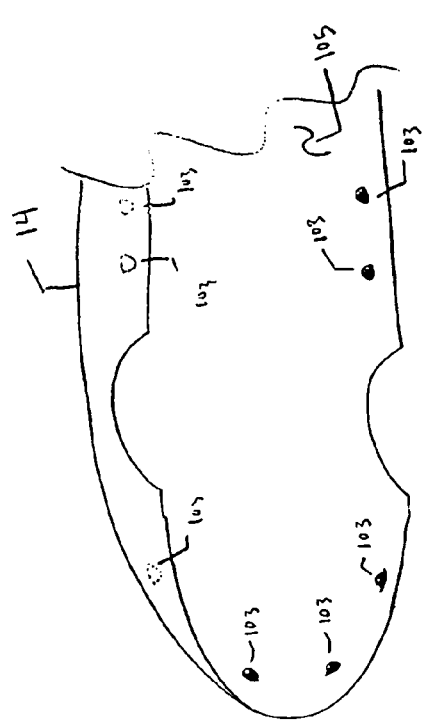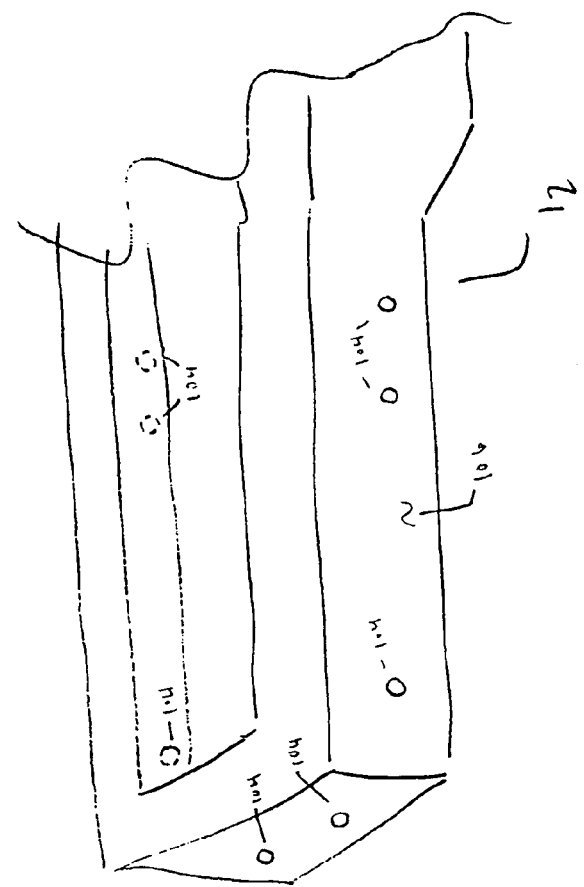
FIG. 2C

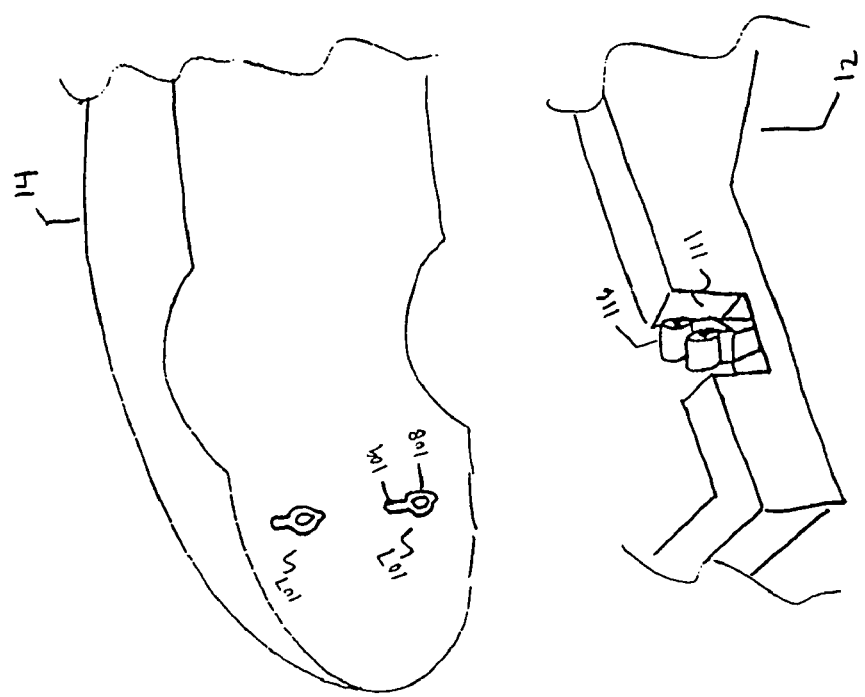

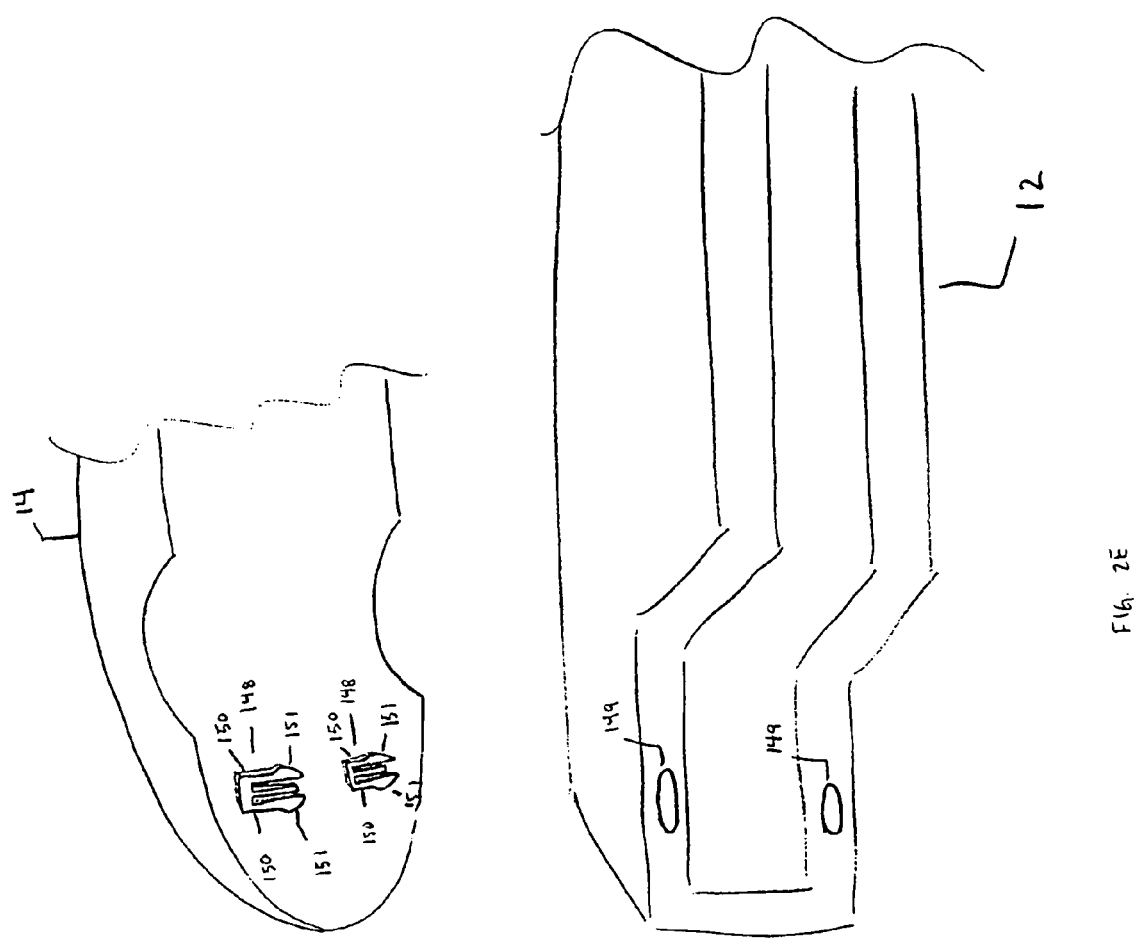

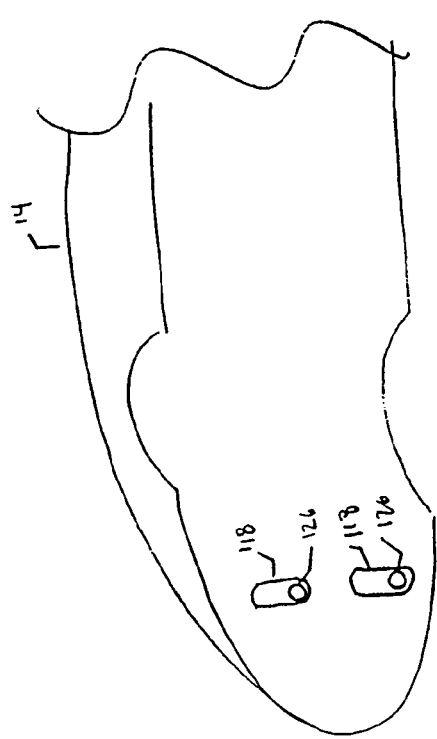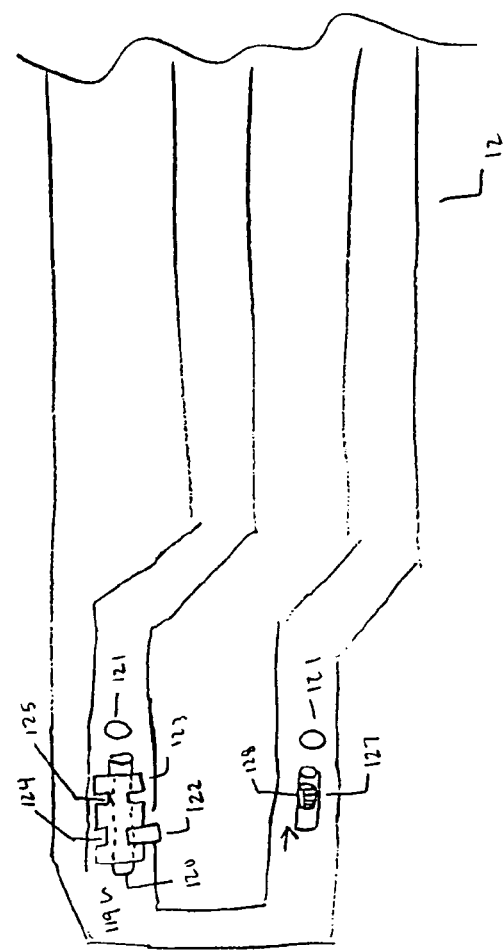
FIG. 29

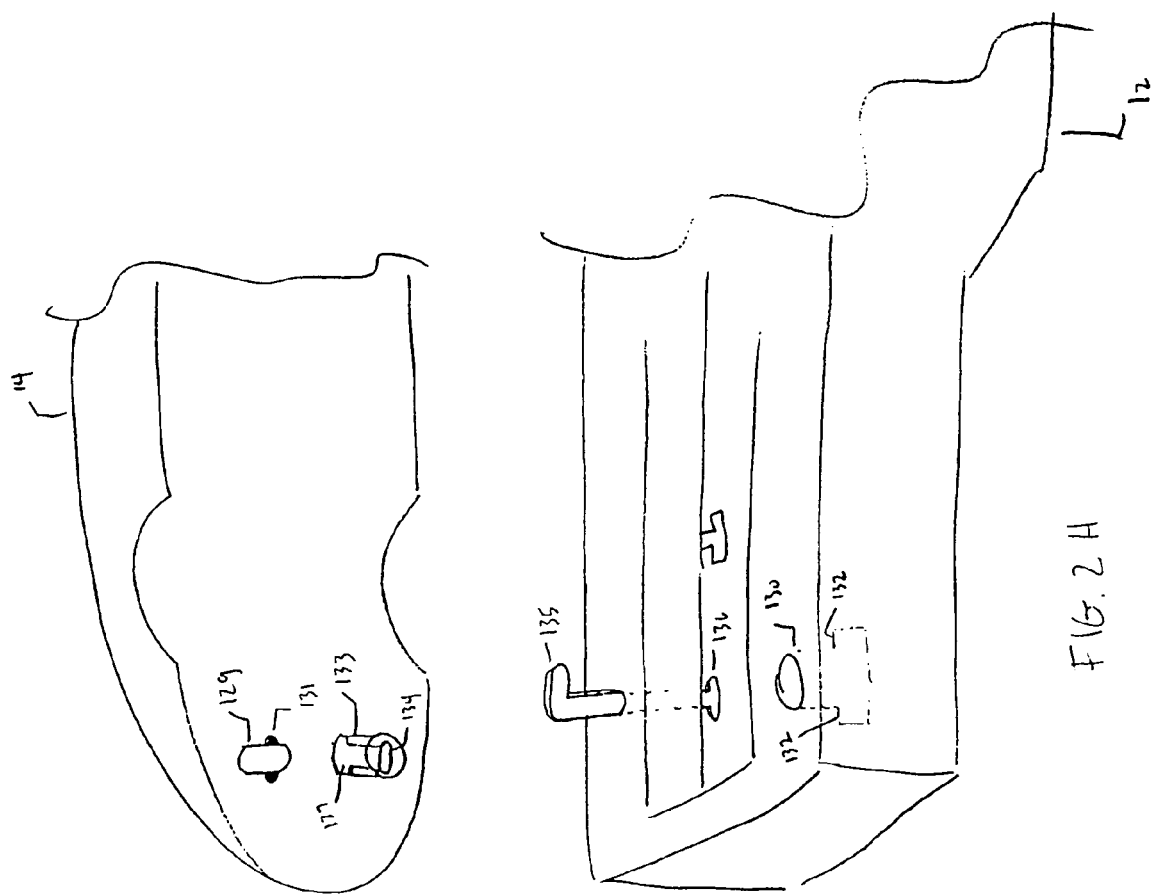

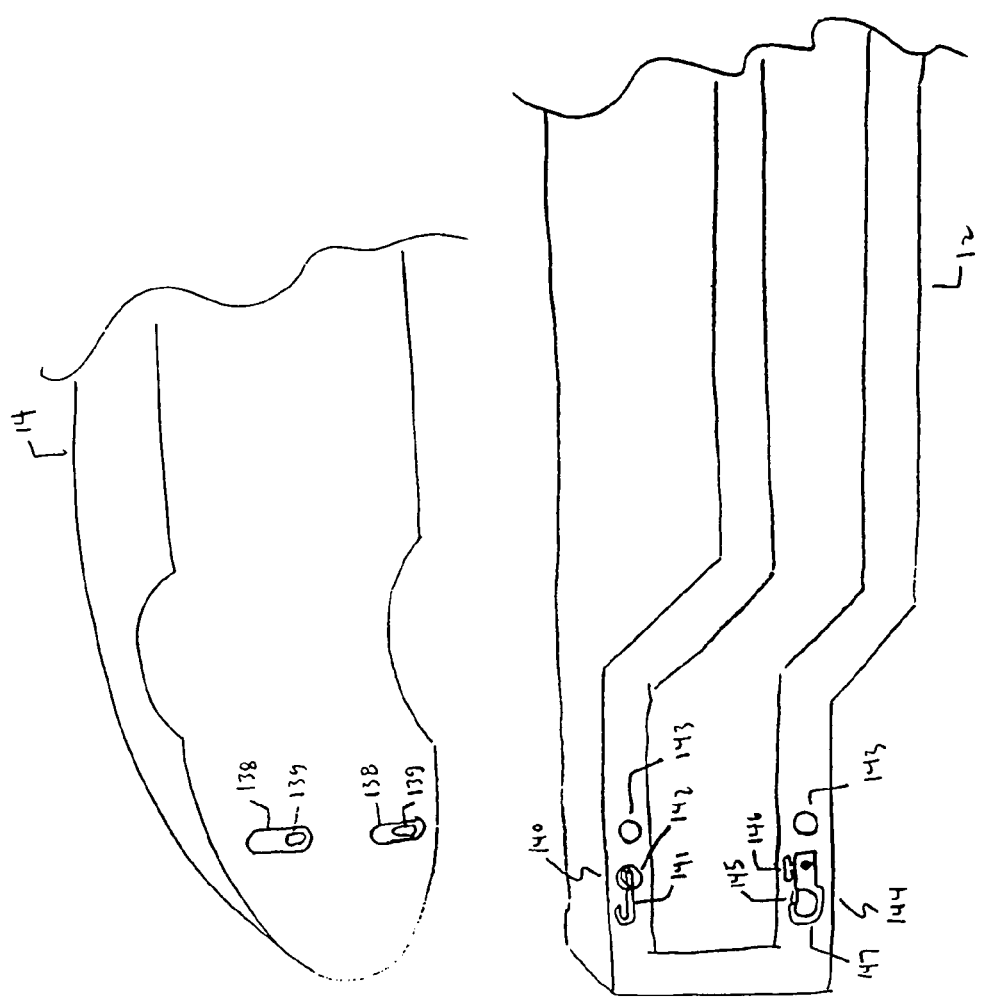

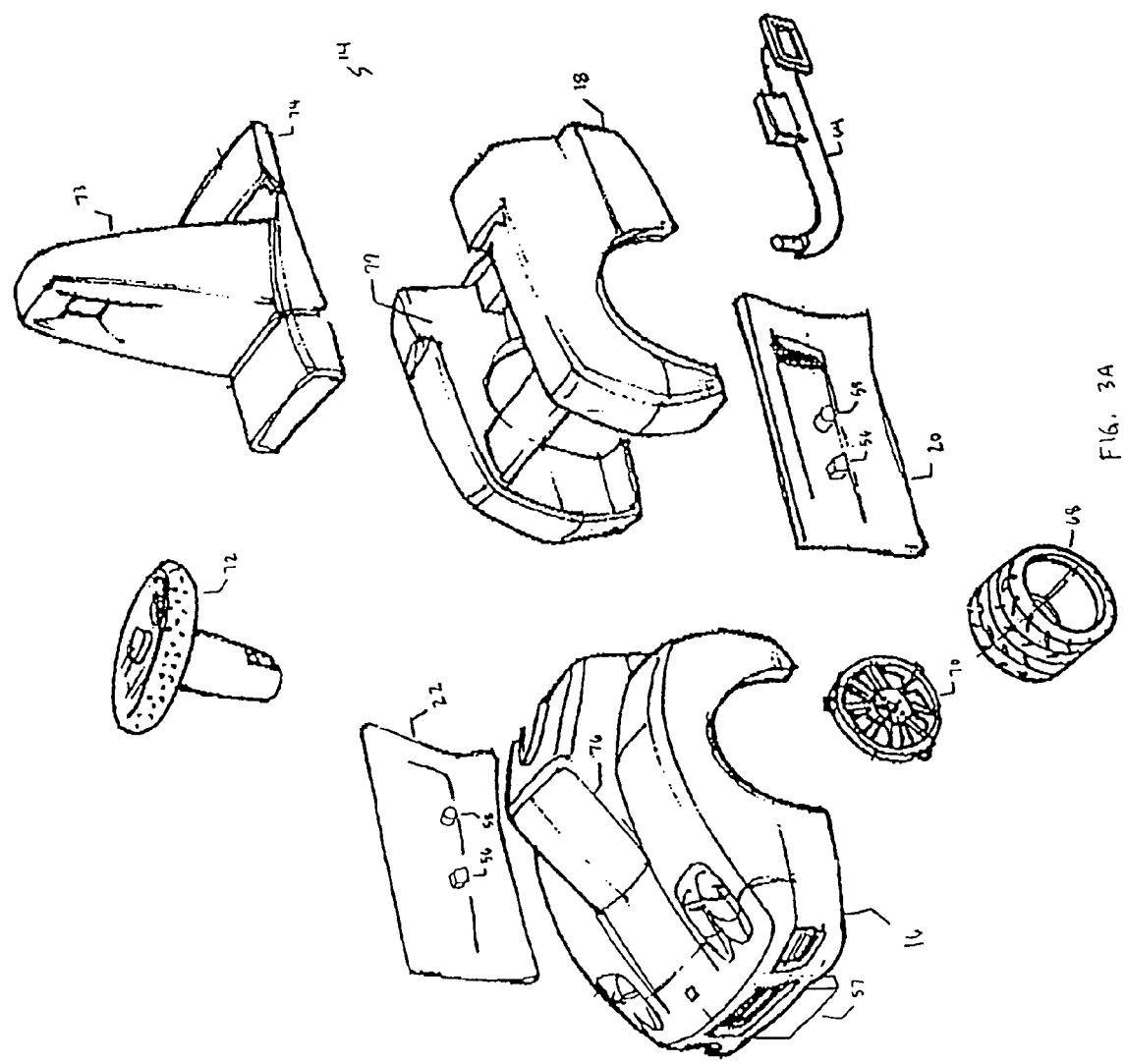

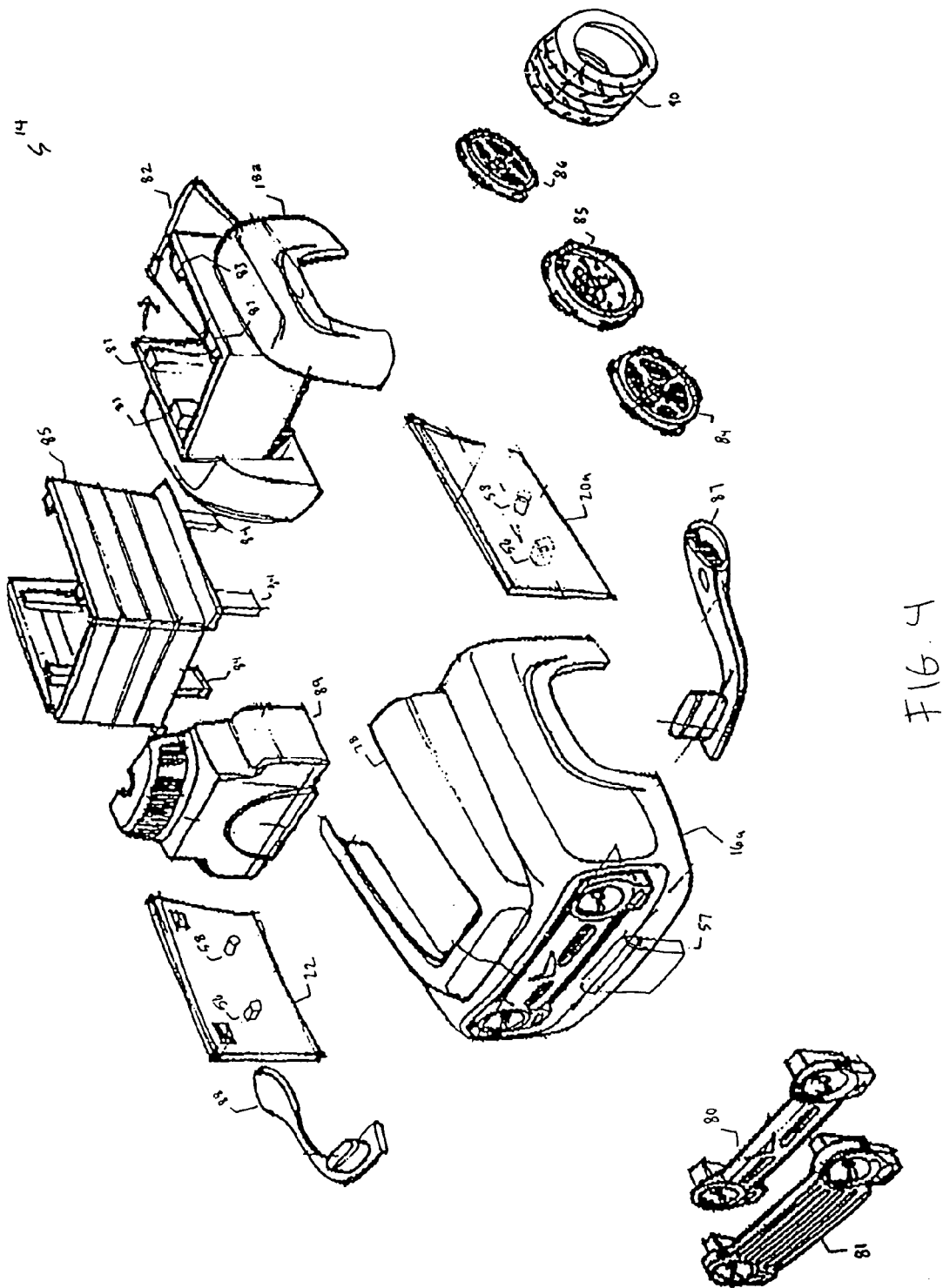

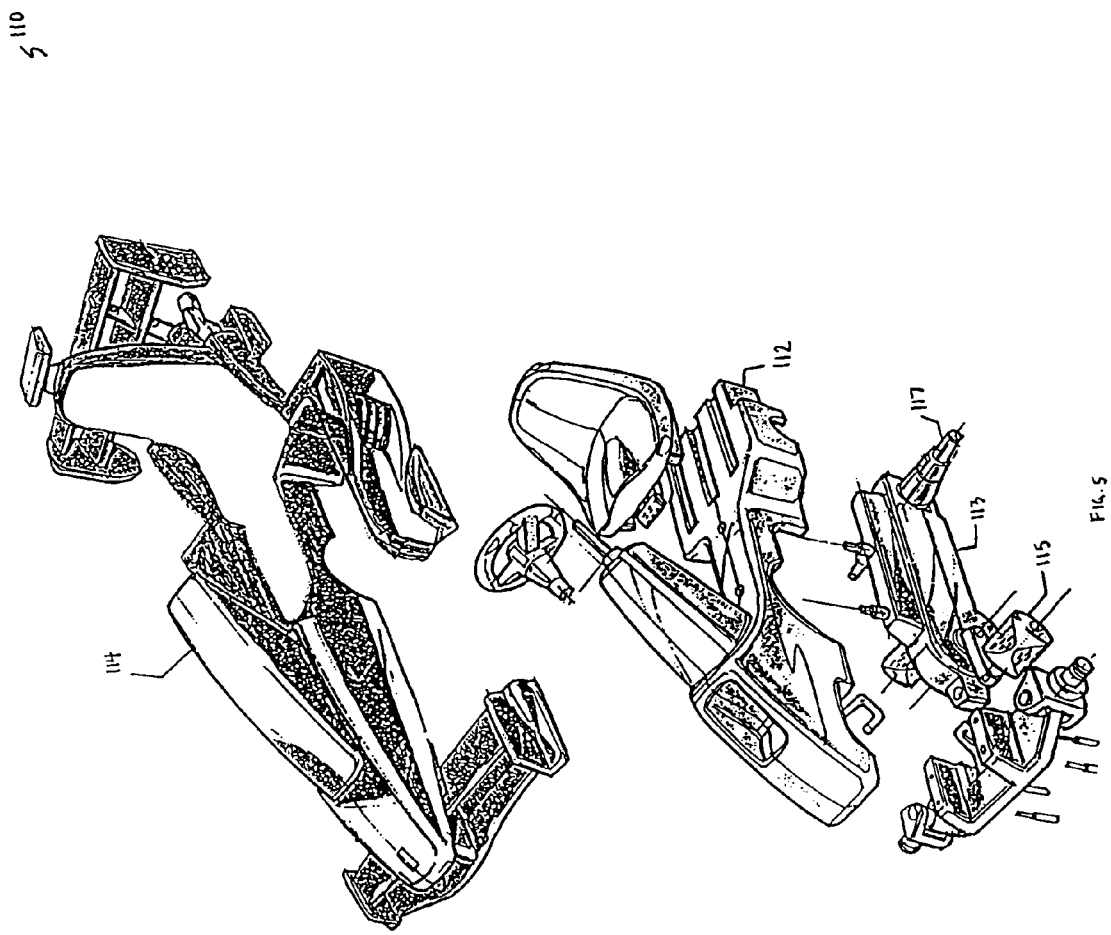

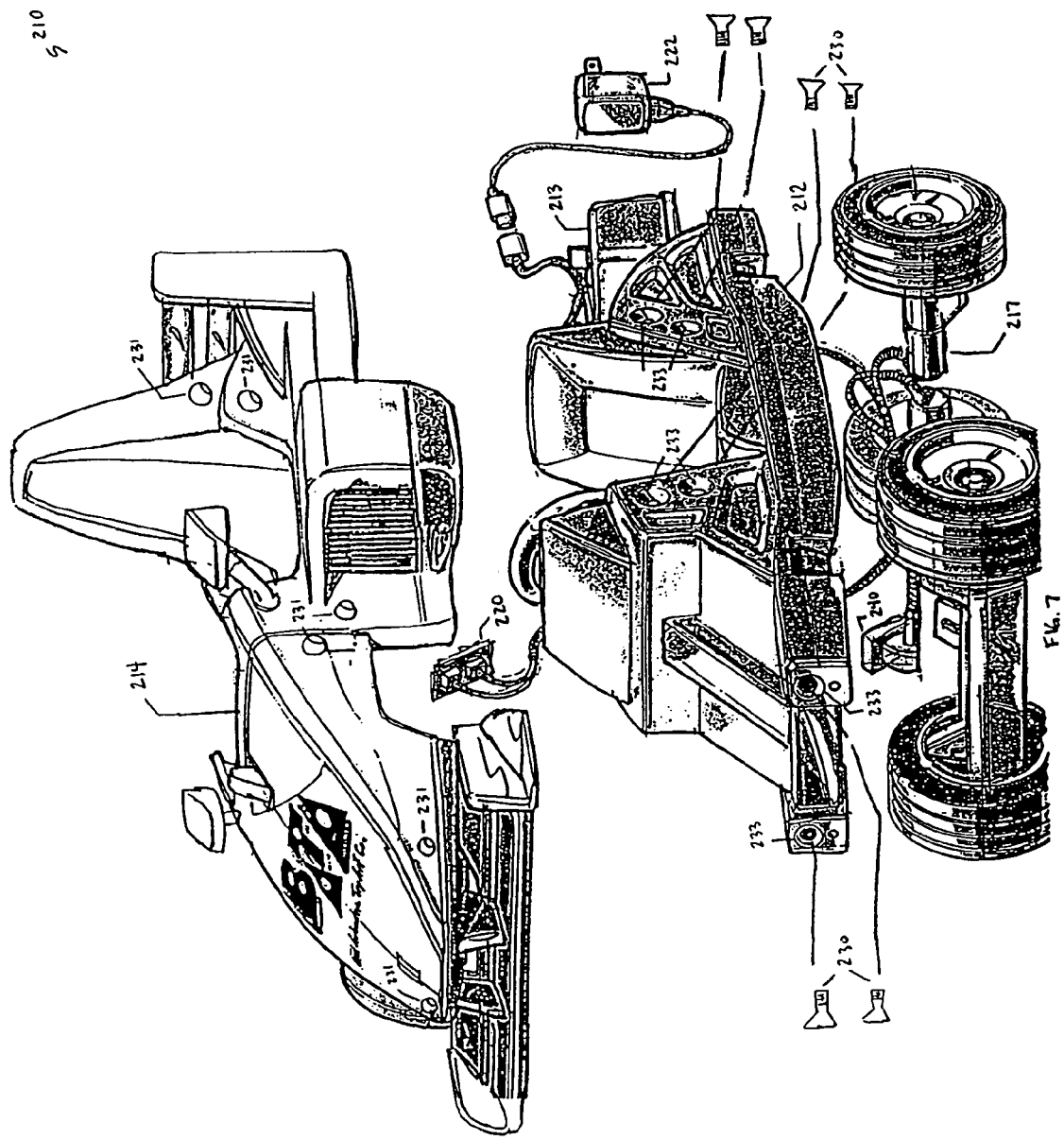

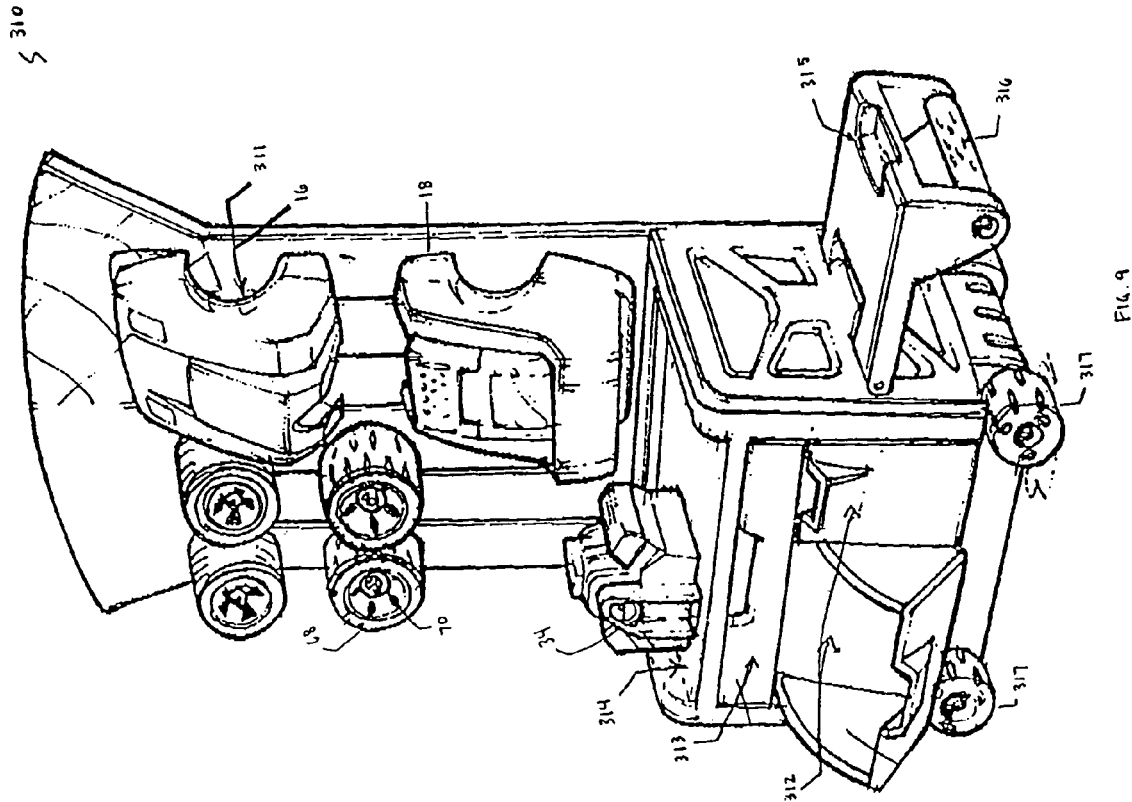

TOY VEHICLES HAVING INTERCHANGEABLE BODY STYLES

CROSS-REFERENCE TO RELATED APPLICATION(S)

This application is a continuation of U.S. patent application Ser. No. 09/975,521, filed on Oct. 11, 2001 now U.S. Pat. No. 6,918,627.

FIELD OF THE INVENTION

This invention relates to child-sized toy vehicles. More particularly, this invention relates to a child-sized toy vehicle having a plurality of interchangeable body styles.

BACKGROUND OF THE INVENTION

Current child-sized toy vehicles come in a variety of different models, which are typically targeted to children of different age ranges. For example, a foot-to-floor toy vehicle is a model which is typically intended for children in the age range of 12–36 months. Foot-to-floor vehicles are propelled when a child, seated on the vehicle, pushes his or her foot against the ground. A pedal toy vehicle is a model which is typically intended for children in the age range of 2–7 years. Pedal vehicles are powered by manually rotating foot pedals which are attached to a transmission unit attached to the axle of the vehicle. An electric toy vehicle is a model which is typically intended for children in the age range of 3–7 years. Electric vehicles are powered by activating an electronic transmission unit which rotates an axle of the vehicle. A gas-powered toy vehicle is a model which is typically intended for children in the age range of 6–11 years. Gas-powered toy vehicles are powered by a gas powered transmission unit which rotates an axle of the vehicle.

Each of the above described models can be produced in a variety of different sizes, shapes, colors and body styles. For example, some toy vehicle makers have produced toy vehicles which resemble various different body styles, such as sports cars, trucks or Jeeps®. However, these toy vehicles do not allow for the interchangeability of body styles, such that one toy vehicle can be assembled, for example with sports car components and later disassembled and replaced with truck components, or assembled as a hybrid vehicle, for instance, having a sports car front end and engine, but a truck rear end and tires.

Children in the intended age range of these toy vehicles can have short attention spans and become bored with individual toys rather quickly. As a result, producing a toy vehicle having interchangeable body styles allows a child to use his or her own creative abilities to transform the toy vehicle according to the child's whimsical desires.

Consequently, an improved child-sized toy vehicle is needed to address the problems of the prior art.

SUMMARY OF THE INVENTION

The present invention addresses the above-referenced problems by providing a child-sized toy vehicle, such as a foot-to-floor vehicle, a pedal vehicle, an electric vehicle or a gas-powered vehicle, having interchangeable body styles. Specifically, the toy vehicle of the present invention comprises a vehicle chassis upon which any number of a plurality of stylistically different interchangeable vehicle body modules may be removably secured. In an alternative embodiment, each of the various vehicle body module styles is comprised of separate body module sections such as a front body module, a rear body module, a left side body module, and a right side body module.

Other objects, advantages and novel features of the present invention will become apparent from the following detailed description of the invention when considered in conjunction with the accompanying drawings.

DESCRIPTION OF THE DRAWINGS

FIGS. 2A–2I are perspective views of a vehicle body module and a vehicle chassis of FIG. 1, showing various attachment mechanisms for attaching the vehicle body module to the vehicle chassis.

FIG. 3A is a perspective view of one of a plurality of stylistically different interchangeable vehicle body modules which may be attached to a vehicle chassis shown in FIG. 1. In this example, the vehicle body module is separated into a front, a rear, a left and a right side body module which can be combined to form a foot-to-floor toy vehicle which resembles a sports car. Additional sports car accessories are also show which may be secured to the toy vehicle to give it a more realistic appearance of a sports car;

FIG. 4 is a perspective view of another one of the plurality of stylistically different interchangeable vehicle body modules which may be attached to a vehicle chassis shown in FIG. 1. In this example, the vehicle body module is separated into a front, a rear, a left and a right side body module which can be combined to form a foot-to-floor toy vehicle which resembles a truck. Additional truck accessories are also show which may be secured to the toy vehicle to give it a more realistic appearance of a truck;

FIG. 5 is an exploded perspective view of a pedal toy vehicle having interchangeable body styles;

FIG. 9 is a perspective view of a garage designed to store toy vehicles having interchangeable body styles and to provide a work surface for assembling such toy vehicles.

DETAILED DESCRIPTION OF THE INVENTION

Figure 1:
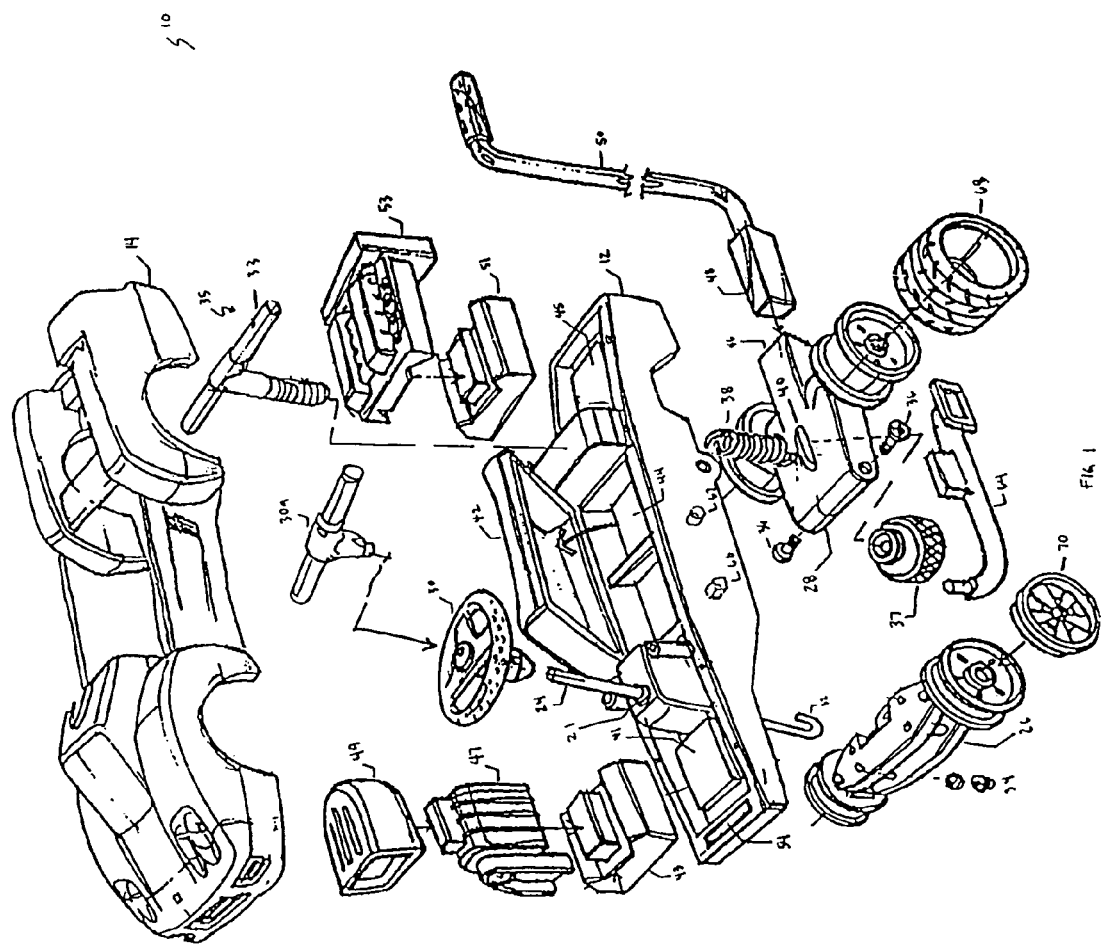
FIG. 1 is an exploded perspective view of a foot-to-floor toy vehicle having interchangeable body styles.

A child-sized toy vehicle 10 having interchangeable body styles is shown in FIG. 1. The vehicle 10 comprises a vehicle chassis 12 upon which any number of a plurality of stylistically different interchangeable vehicle body modules, such as vehicle body module 14, may be removably secured. The vehicle body module 14 for each of the different body styles can be comprised of a single body module, or any number of separate interchangeable body modules which, in combination, form a vehicle body module 14 having a specific body style. For instance, the vehicle body module 14 may be comprised of a front body module and a rear body module which, in combination, form a vehicle body module 14 having specific body style, or as is depicted in FIG. 3A, the vehicle body module 14 may be comprised of a front body module 16, a rear body module 18, a left side body module 20 and a right side body module 22, which in this case, may be combined to form a vehicle body module 14 which resembles a sports car body style. In addition, for each body style additional accessories may be added to the vehicle 10 to give it a more realistic appearance of the body style to which it is intended to depict. Example accessories include, for instance, various shapes, sizes and styles of tires, wheel covers, grills, exhaust pipes, side mirrors, spoilers, engine components, etc.

The toy vehicle 10 can be made in a variety of different models, for example a foot-to-floor toy vehicle model, a pedal toy vehicle model, an electric toy vehicle model, and a gas powered toy vehicle model. Each of these models is targeted to children of a specific age ranges, and each of these models comprises interchangeable body modules which may be designed such that a child of reasonable knowledge, skill and dexterity for the intended age group of each model can interchange the vehicle body module 14 and vehicle accessories without assistance from others.

FIGS. 1–4 show embodiments of a foot-to-floor toy vehicle model. This model is intended for children between the ages of 12 months and 36 months. FIG. 1 shows an embodiment of the vehicle chassis 12 for the foot-to-floor model. The vehicle chassis 12 includes features and sites for attaching a steering column 24, a front axle assembly 26 and a rear axle assembly 28. In the alternative, any or each of these components can be integrally formed to the vehicle chassis 12. The vehicle chassis 12 can contain an aperture 21 for housing the steering column 24. The steering column extends both above the chassis 12 for attachment to a steering wheel 30 and below the chassis 12 for attachment to the front axle assembly 26. The steering column attaches to the front axle assembly 26, for instance, utilizing a hook 32 which causes the front assembly 26 to rotate upon a rotation of the steering wheel 30. Since the intended user for this toy vehicle model is a child in the range of 12 to 36 months, the steering wheel 30 can be a T-bar steering wheel 30a. For very young children, the T-bar steering wheel 30a is easier to manipulate than the more traditional round steering wheel, such as steering wheel 30. The front axle assembly 26 can further be secured to the chassis 12 utilizing screws 34 or other appropriate securing mechanisms.

The rear axle assembly 28 may also be attached to the chassis 12 using an appropriate securing mechanism such as screws 36. In addition, the rear axle 28 may include a spring assembly 35 which can be used to adjustably position a height of a rear portion of the chassis 12. For example, the spring assembly 35 may comprise a screw 33, such as a T-bolt, which may be secured to the chassis 12 and extend through a rear axle opening 40, such as a slot. A spring 38 may be disposed between the chassis 12 and the rear axle 28, such that the spring 38 encases the screw 33 when the screw 33 is extended through the rear axle opening 40. An adjustment knob 37, may form a threaded coupling with the screw 33, such that threading the adjustment knob 37 into the screw 33 compresses the spring 38. The chassis 12 can be positioned level with a riding surface when the adjustment knob 37 is threaded to a stopping point on the screw 33. The chassis 12 can also be positioned in a raised rear position, to resemble the inclining body of a hot rod for example, by loosening the adjustment knob 37 such that the spring 38 is allowed to expand and force the chassis 12 in an upward direction, away from the rear axle 28. With each successive loosening rotation of the adjustment knob 37, the chassis 12 is raised to a higher raised rear position. The rear axle 28 or a rear portion of the chassis 12 may additionally be equipped with an aperture 46 which mates with an insertion end 48 of a push handle 50 to form a releasable coupling. For example, the insertion end 48 of the push handle 50 can contain a groove or an opening which mates with a spring forced lever arm which is disposed within the aperture 46 to form a snap fit coupling. When held in this snap fit coupling, the handle 50 can be used by a parent or other person, to push or pull a child who is riding in the vehicle 10. Alternatively, the insertion end 48 of the handle 50 can be releasably press fit into the aperture 46.

The chassis 12 may also include an integrally hinged, or otherwise releasable seat 42. A storage compartment 44 or multiple storage compartments may be accessed by opening the seat 42. The storage compartment 44 can be used to store snacks, small toys, vehicle accessories or tools, among other things.

FIGS. 2A–2I show a variety of ways in which the vehicle body module 14 may be removably secured to the vehicle chassis 12. However, it should be noted that when the body module 14 is comprised of separate sections, for example as in FIG. 3A where the body module 14 is comprised of front, rear, and side body modules 16, 18, 20, and 22, that each of the body modules 16, 18, 20, and 22 can be individually secured to the vehicle chassis 12 in the same manner as is illustrated in FIGS. 2A-2I for the body module 14.

Figure 2B:
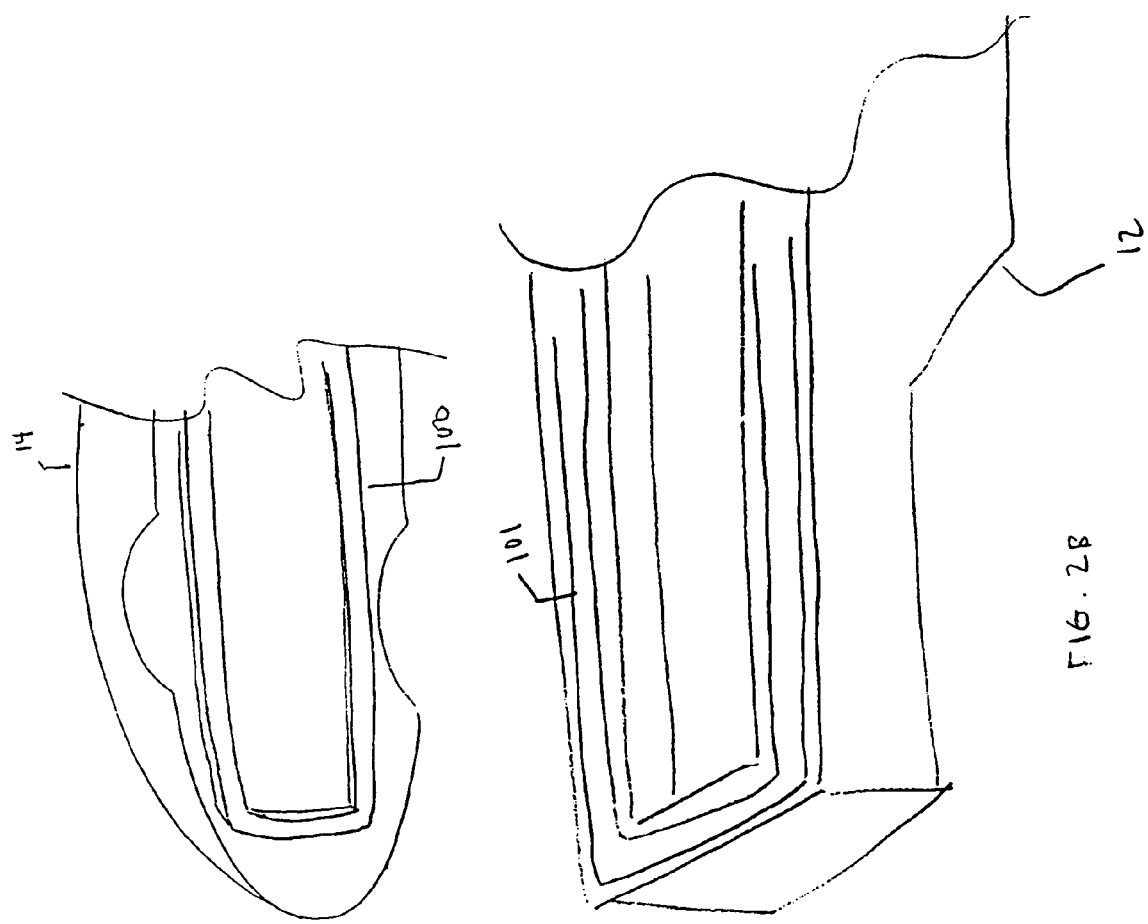

FIGS. 2A–2E show exemplary press fit coupling arrangements between the body module 14 and the chassis 12 which are appropriate for ease in assembly and disassembly by a child of age 12 to 36 months. For example FIG. 2A shows a body module that comprises mounting bosses 17 which press fit into chassis pins 19 to form easily attachable and removable LEGO®-style couplings. The mounting bosses 17 and pins 19 may be round (as shown) square, rectangular, ovular, or any other shape appropriate for a press fit coupling.

The body module 14, or body modules (in the case where the body module 14 comprises separate body modules such as front, rear and side modules 16, 18, 20, and 22) may be additionally secured to the chassis 12 utilizing a hinged plug 52. For instance, in one embodiment, the chassis 12 contains a slot 54 into which the mounting portion 55 of the hinged plug 52 fits. The body module 14, in turn, comprises a rotatable female plug 57 which forms a rotatable press fit coupling with the hinged plug 52. When such an arrangement is utilized on the front body module 16, the female plug 57 of the front body module 16 may be secured to the hinged plug 52 of the chassis 12 while a back portion of the front body module 16 is rotated away from the chassis 12 to simulate the motion of an opening of a hood of a typical adult-sized vehicle. Rotating the front body module 16 away from the chassis 12 allows an attachment site 41 (shown in FIG. 1) to be accessible for an attachment of an engine 43 (shown in FIG. 1), or another vehicle accessory. The hinged plug 52 and the rotatable female plug 57 may similarly be used to rotatably secure the rear body module 18 to the chassis 12. In the same manner as is described above, the rear body module 18 can be rotated away from the vehicle chassis 12 to expose an attachment site, in this case attachment site 45 (shown in FIG. 1), wherein the engine 43 (shown in FIG. 1) or another vehicle accessory may be attached.

In an alternative embodiment, the chassis 12 may comprise slider pins 58 which mate with openings 59 in the body module 14. When the body module 14 is placed on top of the chassis 12, the slider pins 58 can be extended through the body module openings 59 such that the body module 14 is rotatably coupled to the chassis 12.

FIG. 2B shows another exemplary press fit coupling arrangement between the body module 14 and the chassis 12. In this example, the body module 14 may comprise a strip 100 which couples to a pad 101 on the chassis. In one example the strip 100 is a magnetic strip and the pad 101 is a metallic pad, such that a magnetic coupling may be formed. In another example, the strip 100 comprises Velcro® hooks and the pad 101 comprises Velcro® loops, such that a Velcro® coupling may be formed. In yet another example, the strip 100 comprises a rail which protrudes from a surface of the body module 14 and the pad 101 comprises a slot or a groove into which the rail may be inserted. The rail may reside relatively loosely in the slot or groove or it may be press or snap fit into the slot or groove.

FIG. 2C shows a press fit coupling arrangement between the body module 14 and the chassis 12, wherein an inner surface 105 of the body module 14 comprises a plurality of knobs 103 and an outer surface 106 of the chassis 12 comprises a plurality of mating openings 104, such as apertures, slots, or grooves. To form this coupling arrangement, the body module 14 is placed above the chassis 12 and lowered until the knobs 103 mate with the mating openings 104 which secure the knobs 103 to the chassis 12. As the body module 14 is lowered, the chassis 12 compresses the knobs 103 until the knobs 103 reach the openings 104, at which time the knobs 103 decompress and form couplings with the mating openings 104. In the alternative, the knobs 103 can be semi-rigid and the chassis 12 can be formed of a flexible material such that when the body module 14 is lowered the knobs 103 compress the chassis 12 until the knobs 103 mate with the openings 104, at which time the chassis 12 decompresses to return to its previous form.

FIG. 2D shows a press fit coupling arrangement between the body module 14 and the chassis 12, wherein the body module 14 comprises a plurality a pins 107 and the chassis 12 comprises a plurality of spring assemblies 111 which mate with the pins 107. The spring assemblies 111 comprise a pair of spring loaded roller arms 116 which are biased towards each other. When one of the pins 107 is inserted into one of the spring assemblies 111, the pin 107 forces the roller arms 116 apart such that the roller arms 116 trace the perimeter of the pin 107. The pin 107 comprises a pin head 108 which is wider than the pin base 109, such that after the wide pin head 108 has been inserted into the spring assembly 111, the roller arms 116 form around the narrower pin base 109 to releasably trap the pin head 108 within the assembly 111, thus securing the body module 14 to the chassis 12.

FIG. 2E shows a press fit coupling arrangement between the body module 14 and the chassis 12, wherein the body module 14 comprises a spring 148, and the chassis 12 comprises an opening 149 which mates with the spring 148. For example, the spring 148 may comprise spring arms 150 that are biased away from each other and have head portions 151 that widen. When the spring 148 is inserted into the chassis opening 149, the wide head portions 151 of the spring 148 are compressed towards each other by the walls of the chassis opening 149. When the head portions 151 of the spring 148 have extended beyond the chassis opening 149, the spring arms 150 spring back to their original positions such that the head portions 151 of the spring 148 are coupled to the end of the chassis opening 149 which acts as a shoulder to secure the head portions 151 of the spring 148 to the chassis 12, thus securing the body module 14 to the chassis 12.

FIGS. 2F–2I show exemplary releasable interlocking coupling arrangements between the body module 14 and the chassis 12 which may require more skill and hand dexterity than is typically acquired by a child of age 12 to 36 months. Nevertheless, these arrangements are also contemplated by the present invention.

FIG. 2F shows an interlocking coupling arrangement between the body module 14 and the chassis 12, wherein the body module 14 comprises an arm 152 having a rotatable head 153 and the chassis 12 comprises an opening 154 which mates with the arm 152. The arm 152 may be inserted unto the chassis opening 154 such that the arm head 152 extends beyond the chassis opening 154. The arm head 152 may then be rotated such that the end of the chassis opening 154 acts as a shoulder to secure the arm 152 to the chassis 12, thus securing the body module 14 to the chassis 12.

FIG. 2F also shows an alternative interlocking coupling arrangement wherein the body module 14 comprises a hook 155 and the chassis 12 comprises a latching mechanism 156 and a chassis opening 157 through which the hook 155 may be inserted. The latching mechanism 156 may comprise a lever arm 158 and a latch 159 pivotally secured to the lever arm 158 by a pin 160. When the hook 155 has been inserted into the chassis opening 157, the latch 159 may be positioned around the hook 155 and the lever arm 158 may be pivoted away from the latch 159 to tighten the latch 159 around the hook 155, thus securing the body module 14 to the chassis 12.

FIG. 2G shows an interlocking coupling arrangement between the body module 14 and the chassis 12, wherein the body module 14 comprises a pin 118 and the chassis 12 comprises a latching mechanism 119. The latching mechanism 119 may comprise an arm 120, a handle 122 and a housing 123. The handle 122 may be attached to the arm 120 such that a movement of the handle 122 causes the arm 120 to move within the housing 123. The handle 122 may be interlocked with the housing 123 in either a unlocked position 124 or a locked position 125. When the pin 118 is inserted into a chassis opening 121, the arm 120 may be inserted into a pin opening 126 by moving the handle 122 from the unlocked position 124 to the locked position 125. As a result, the arm 120 secures the pin 118 and thus the body module 14 to the chassis 12.

FIG. 2G also shows an alternative interlocking coupling arrangement wherein a spring loaded arm 127 is coupled to the chassis 12. In this example, the spring loaded arm 127 may be biased in a direction towards the chassis opening 121. A handle 128 on the arm 127 can be used to force the arm 127 away from the chassis opening 121 such that the pin 118 can be inserted into the chassis opening 121 such that the pin opening 126 is extended beyond the chassis opening 121. Once in this position, the handle 128 can be released to allow the arm 127 to be inserted into the pin opening 126 to secure the body module 14 to the chassis 12.

FIG. 2H shows an interlocking coupling arrangement between the body module 14 and the chassis 12, wherein the body module 14 comprises a pin 129 and the chassis 12 comprises an opening 130. The pin 129 comprises one or more knobs 131 and the chassis opening 130 widens to form shoulders 132. When the pin 129 is inserted into the chassis opening 130, the walls of the chassis opening 130 compress the knobs 131 until the knobs 131 reach the shoulders 132, at which time the knobs decompress and form couplings with the shoulders 132, thus securing the body module 14 to the chassis 12. In the alternative, the knobs 131 are semi-rigid and the walls of the chassis opening 130 are made of a flexible material such that when the knobs are inserted into the chassis opening 130, the walls of the chassis opening 130 flex away from the knobs 131 and snap back to position when the knobs 131 reach the shoulders 132.

Also shown in FIG. 2H is an interlocking coupling arrangement between the body module 14 and the chassis 12 wherein the body module 14 comprises a pin 133 having an opening 134, and the chassis 12 comprises an arm 135 having a turning knob 136. The arm 135 may comprise a locked position and an unlocked position. When the arm 135 is in the unlocked position, it may be inserted into and travel through the pin opening 134 until the arm 135 reaches a shoulder area 137. When the arm 135 is in the shoulder area 137, the turning knob 136 can be rotated to the locked position, which in turn rotates the arm 135 into a position against the shoulder area 137, thus securing the body module 14 to the chassis 12.

FIG. 2I shows an interlocking coupling arrangement between the body module 14 and the chassis 12, wherein the body module 14 comprises a pin 138 having a pin opening 139 and the chassis 12 comprises a hook assembly 140 having a hook 141 which may be pivotally secured to the chassis 12 such that the hook 141 may be positioned in a locked position and an unlocked position. For example, the hooking assembly 140 may comprise a turning knob 142, such that when the pin 138 is inserted into a chassis opening 143 the turning knob 142 can be rotated to move the hook 141 from its unlocked position into its locked position. In the locked position, the hook 141 engages the pin opening 139, thus securing the body module 14 to the chassis 12.

Also shown in FIG. 2I is an interlocking coupling arrangement between the body module 14 and the chassis 12 wherein the chassis 12 comprises a closed hook assembly 144. The closed hook assembly 144 may comprise a lever arm 145, a handle 146, and a hook 147. The level arm may be biased in the direction towards the hook 147, such that a closed hook is formed. The handle 146 may be moved in a direction away from the hook 147 to force the lever arm 145 into an opened hook position. When the pin 138 is inserted into the chassis opening 143, and the lever arm 145 is in the open hook position, the hook 147 may be positioned interlockingly with the pin opening 139, the handle 146 can then be released to place the lever arm 145 in the closed hook position such that the body module 14 is secured to the chassis 12.

FIG. 3A shows one of the plurality of stylistically different interchangeable vehicle body modules, vehicle body module 14. In this case the vehicle body module 14 resembles a sports car. In this example, the vehicle body module 14 is comprised of four separate module sections, the front body module 16, the rear body module 18, the left side body module 20 and the right side body module 22. The body modules 16, 18, 20, and 22 may be attached to the vehicle chassis 12 by any of the means described in FIG. 2A–2I.

In addition to the front, rear, left and right side body modules 16, 18, 20 and 22 of FIG. 3A, all of which resemble a sports car, other sports car accessories may be interchangeably added to the vehicle 10 to produce a vehicle that even more closely resembles that of a typical adult-sized sports vehicle. Example accessories include, a variety of wheel covers, such as sporty wheel cover 70, a sporty steering wheel 72, a backrest 73, a rear spoiler 74, racing tires 68, and an exhaust pipe 64, among other accessories. These additional sports car accessories may be attached to either the chassis 12 or body module 16, 18, 20, or 22 by any of the methods described in FIGS. 2A–2I.

In addition, the front body module 16 may comprise an opening 76 out of which the engine 43 (shown in FIG. 1) may protrude. The rear body module 18 may also comprise an opening 77 out of which the engine 43 may protrude. Referring back to FIG. 1, the engine 43 may be attached to either a front portion of the chassis 12 at attachment site 41 or to a rear portion of the chassis 12 at attachment site 45. Additional engine components may be attached to the engine 43 to form various engine styles. For instance, engine components 47 and 49 may be attached to the engine 43 to form a racing style engine assembly, or engine components 51 and 53 can be combined to form a high performance engine assembly. The engine components 43, 47, 49, 51 and 53 can be interchangeably attached both to each other and to the attachment sites 41 and 45 by any of the methods of FIGS. 2A–2I.

Figure 3B:
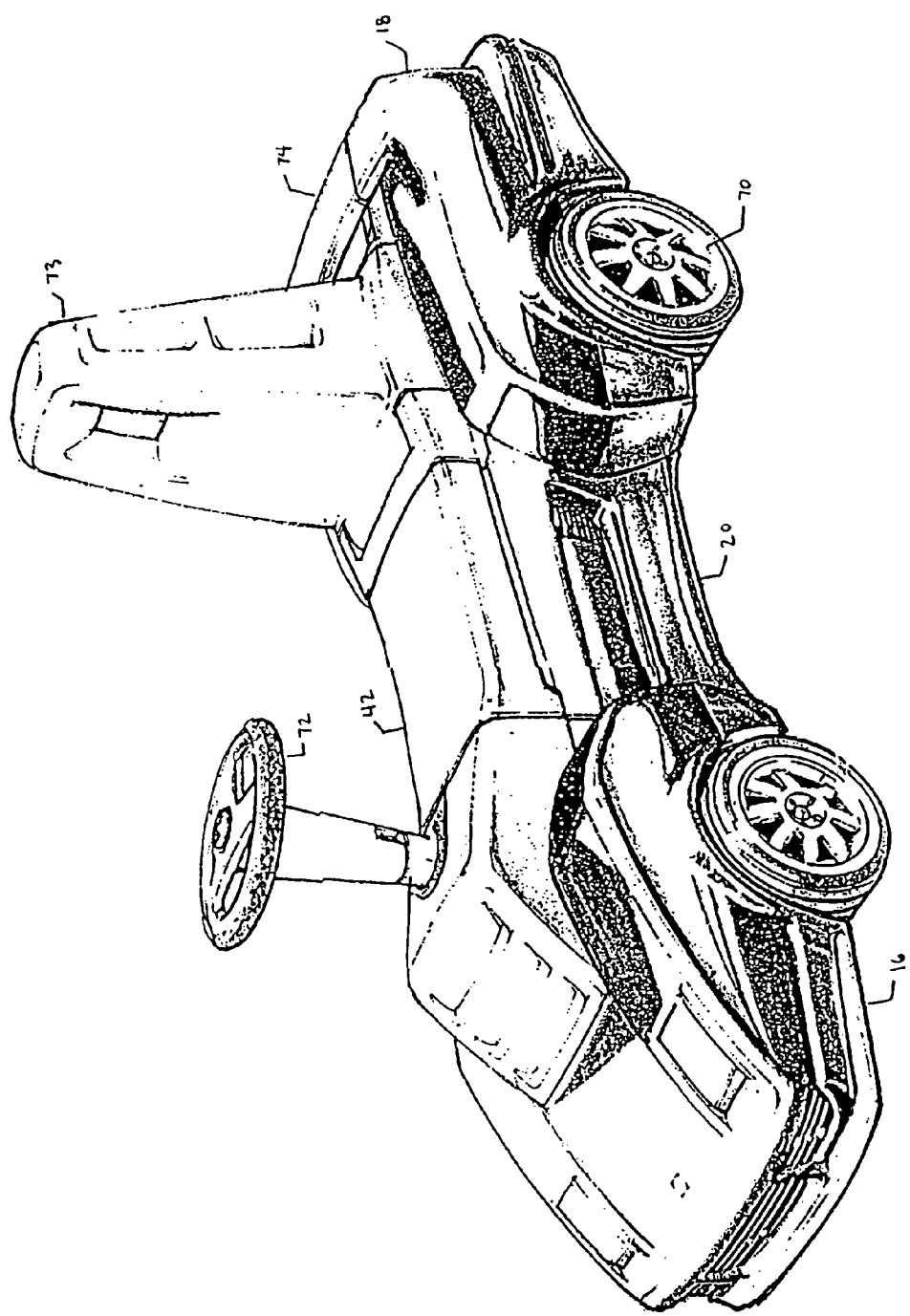
FIG. 3B is a perspective view of an assembled foot-to-floor toy vehicle which resembles a sports car constructed by combining the body modules and sports car accessories of FIG. 2 and the vehicle chassis of FIG. 1.

The left and right side body modules 20 and 22 may comprise adjacently positioned attachment mechanisms which are of a different shape, size or style to prevent the side modules 20 and 22 from being assembled up-side-down or backward onto the chassis 12. For example, referring to FIGS. 1 and 3A, the side body modules 20 and 22 may comprises pegs or similar structures which have different shapes, such as a square peg 56 and a round peg 58 which press fit into a square aperture 60 and a round aperture 62, respectively, in the chassis 12. Although pegs have been described, any of the attachment mechanisms described in FIGS. 2A–2I can be adjacently positioned on the left or right side body module 20 or 22 to prevent an incorrect assembly of the modules 20 and 22 onto the chassis 12, as long as the attachment mechanisms used are of a different shape, size or style. An example embodiment of an assembled foot-to-floor vehicle is shown in FIG. 3B, in this case the foot-to-floor vehicle resembles a sports car.

FIG. 4 shows another of the plurality of stylistically different interchangeable vehicle body modules, vehicle body module 14. In this case the vehicle body module 14 resembles a truck. In this example, the vehicle body module 14 is comprised of four separate module sections, a front body module 16a, a rear body module 18a, a left side body module 20a and a right side body module 22a. The truck body modules 16a, 18a, 20a, and 22a may be assembled onto and disassembled from the vehicle chassis 12 in the same manner as is described above for the sports car body modules 16, 18, 20, and 22. As a result, if for example a sports car has been assembled as described above, but is no longer desired, the sports car body modules 16, 18, 20, and 22 as well as any other sports car accessories can be disassembled and replaced by the truck body modules 16a, 18a, 20a, and 22a and truck accessories such that the toy vehicle 10 is completely transformed from a toy vehicle 10 which resembles a sports car to a toy vehicle 10 which resembles a truck.

Alternatively, some of the sports car body modules 16, 18, 20, and 22 and sports car accessories can remain assembled while other sports car body modules 16, 18, 20, and 22 and sports car accessories are disassembled and replaced by truck body modules 16a, 18a, 20a, and 22a and other truck accessories, such that a hybrid car is produced. For example, the sports car rear body module 18 can be removed from the chassis 12 and replaced with the truck rear body module 18a such that a sports car with a truck bed is produced. In addition, a hybrid vehicle can be comprised of any other combination of sports car components and truck components. Also, any combination of any of the plurality of stylistically different body modules and vehicle accessories can be attached to the same vehicle chassis 12 to form a wide range of hybrid vehicles.

The truck front body module 16a may comprise an opening 78 out of which engine components 43, 47, 49, 51 and/or 53 may protrude. In addition, truck front body module 16a may comprise attachment sites wherein one of a plurality of stylistically different interchangeable grills 80 and 81 may be attached. The truck rear body module 18*a* may resemble a pickup truck bed, and may comprise a rotatable tailgate 82 which has an opened position and a closed position. The truck rear body module 18*a* may also contain slots 83 which mate with stake bed plugs 84 to attach a stake bed 85 to the rear body module 18*a*.

FIG. 4 also shows other truck components which may be interchangeably added to the toy vehicle 10 to produce a toy vehicle that more closely resembles that of a typical adult-sized truck. Example truck accessories include, a variety of wheel covers 84–86, side exhaust pipes 87 and 88, a truck-style steering column 89, a variety of steering wheel styles (not shown), and over-sized tires 90, among other accessories. These additional truck accessories may be attached to either the chassis 12 or body module 16*a*, 18*a*, 20*a*, or 22*a* by any of the methods described in FIGS. 2A–2I.

Although sports cars and trucks have been described, a vast array of stylistically different interchangeable vehicle body module, such as body module 14, and vehicle accessories are also contemplated by the present invention, such as Indy Cars, Stock Cars, Sports Utility Vehicles, Jeeps®, Police Cars, Fire Trucks, Emergency Vehicles, licensed designs such as, Bentleys®, Ferraris®, Corvettes®, and a Porsches® as well as other body styles and designs.

Each of the components discussed in conjunction with FIGS. 1–4 may be comprised of a blow molded plastic material, although other materials and other methods of production may be used, for example, injection molding a plastic material, such as ABS (Acrylonitrile Butadiene Styrene) plastic, or machining a plastic material such as ABS plastic, or machining a stronger material such as a metal, for instance, aluminum or stainless steel.

Figure 6:
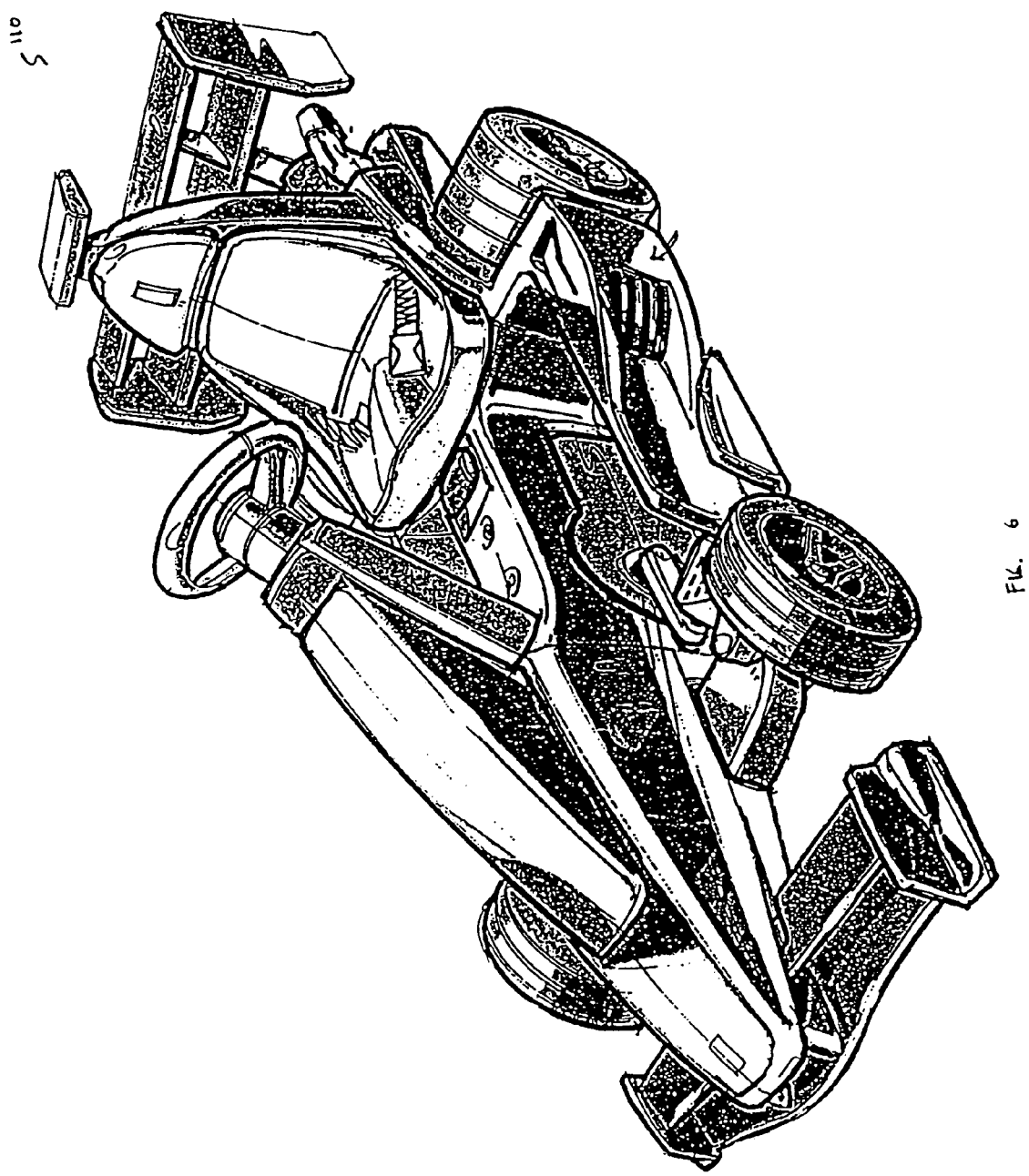
FIG. 6 is a perspective view of an assembled pedal toy vehicle which resembles an Indy car.

A second model of the toy vehicle 10 of the present invention is a pedal toy vehicle model 110 shown in FIGS. 5–6. Each of the assembly techniques described above in conjunction with the foot-to-floor vehicle of FIGS. 1–4, and specifically FIGS. 2A–2I, can be employed for the assembly of the pedal vehicle 110 of FIGS. 5–6. Also like the foot-to-floor vehicle, the pedal vehicle 110 may be designed such that a child of reasonable knowledge, skill and dexterity for the intended age group, in this case 2–7 years of age, can interchange the vehicle module body styles and accessories without assistance from others. In addition, like the foot-to-floor vehicle, the components of the pedal vehicle 110 may be constructed from a material such as a blow molded plastic material, an injection molded plastic, such as ABS, a machined plastic, such as ABS, or a machined metal, such as aluminum or stainless steel.

FIG. 5 shows a vehicle chassis 112 for the pedal vehicle 110. Secured to the chassis 112 is a transmission unit 113. The transmission unit 113 may comprise rotatable foot pedals 115. Rotation of the foot pedals 115 causes an axle 117 to rotate, which in turn causes wheels which are secured to the axle 117 to rotate, such that the vehicle 110 is propelled when the vehicle 110 is on a riding surface.

Any number of a plurality of stylistically different interchangeable vehicle body modules, such as vehicle body module 114, may also be removably secured to the chassis 112. In FIG. 5, the body module 114 is shown as being comprised of a single piece, however the vehicle body module 114 can be comprised of separate body module sections such as a front body module, a rear body module, a left side body module, and a right side body module, each of which may be removably coupled to the chassis 112. In addition, vehicle accessories for each of the various body styles may be secured to the vehicle body module 114 or the chassis 112 so that the pedal vehicle 110 more closely resembles the vehicle type to which it is intended to depict. Also, as is described for the foot-to-floor vehicle, the vehicle body module 114 and vehicle accessories for the pedal vehicle 110 from different body types may be combined on the same chassis 112 to form a hybrid pedal vehicle having, for instance a pedal vehicle 110 front end which resembles a sports car and a pedal vehicle 110 back end which resembles a truck.

As in the foot-to-floor model, a vast array of stylistically different interchangeable vehicle body modules, such as vehicle body module 114, and vehicle accessories are contemplated for the pedal vehicle 110, such as Indy Cars, Stock Cars, Sports Utility Vehicles, Jeeps®, Police Cars, Fire Trucks, Emergency Vehicles, licensed designs such as, Bentleys®, Ferraris®, Corvettes®, and a Porsches® as well as other body styles and designs. An example embodiment of an assembled pedal vehicle 110 is shown in FIG. 6, in this case the pedal vehicle 110 resembles an Indy Car.

Figure 7F:
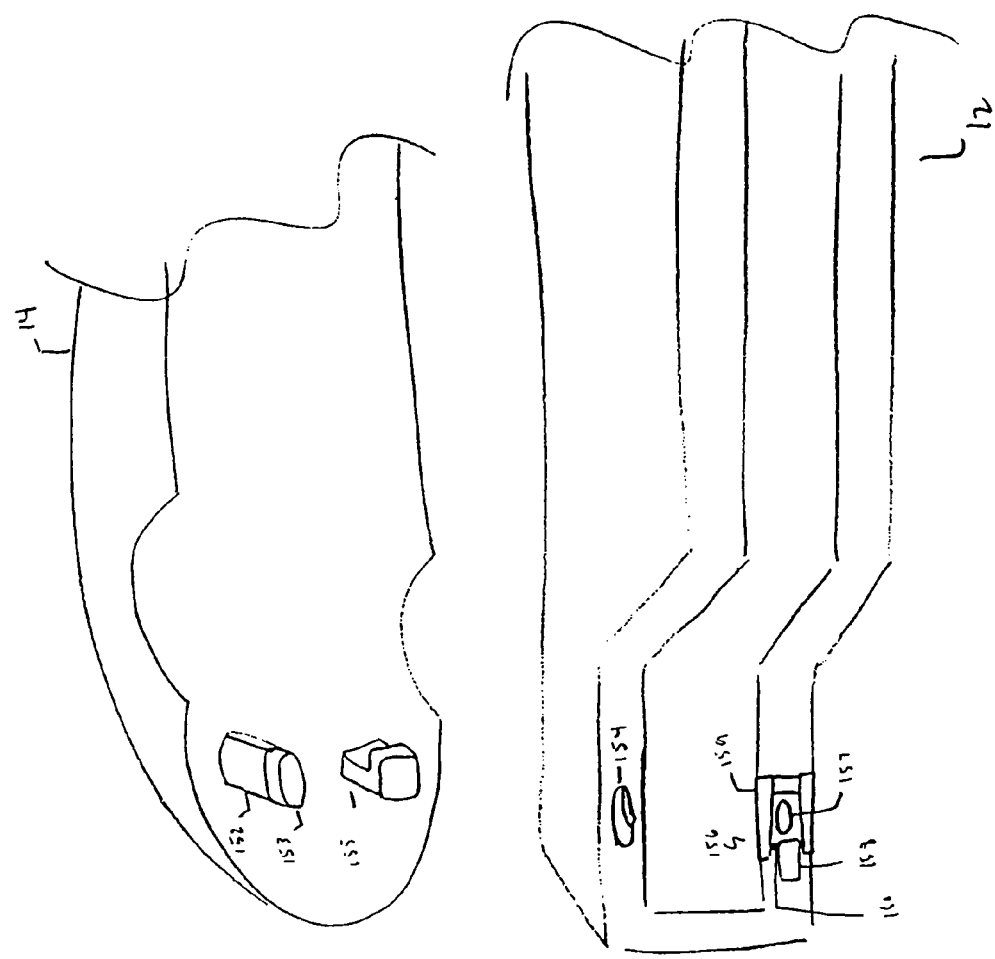
FIG. 7 is an exploded perspective view of an electric or gas powered toy vehicle having interchangeable body styles.
Figure 8:
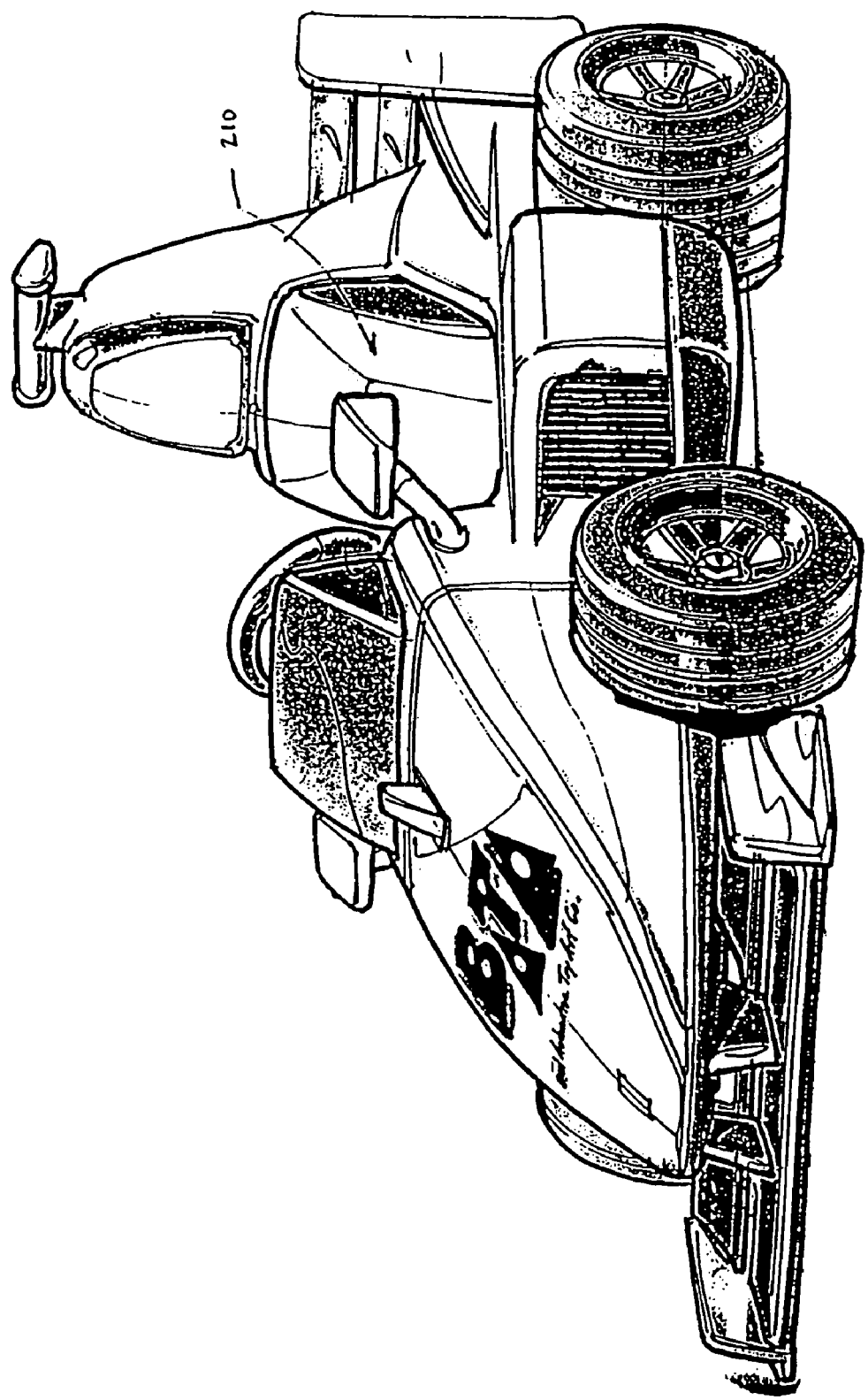
FIG. 8 is a perspective view of an assembled electric or gas powered toy vehicle which resembles an Indy car.

A third model of the toy vehicle 10 of the present invention is an electric toy vehicle model 210 shown in FIG. 7–8. Each of the assembly techniques described above in conjunction with the foot-to-floor vehicle of FIGS. 1–4, specifically FIGS. 2A–2I, can be employed for the assembly of the electric vehicle 210 of FIG. 7. Also like the foot-to-floor vehicle, the electric vehicle 210 can be designed such that a child of reasonable knowledge, skill and dexterity for the intended age group, in this case 3–7 years of age, can interchange the vehicle module body styles and accessories without assistance from others. Since the electric vehicle 210 is designed for use by children in an older age range than the intended users of the foot-to-floor vehicle, the assembly techniques and attachment devices for the electric vehicle 210 may be slightly more advanced than that which is described above for the foot-to-floor vehicles. For example, some simple mechanical tools such as screw drivers may be required for the assembly and interchanging of parts for the electric vehicle 210. For instance, the body module 214 made be secured to the chassis 212 by a plurality of screws 230 which pass through apertures 231 in the body module 14 and into sections 233 of the chassis 212 which may be internally threaded.

In addition, like the foot-to-floor vehicle, the components of the electric vehicle 210 may be constructed from a material such as a blow molded plastic material, an injection molded plastic, such as ABS, a machined plastic, such as ABS or a machined metal, such as aluminum or stainless steel.

FIG. 7 shows a vehicle chassis 212 for the electric vehicle 210. Secured to the chassis 212 is an electronic transmission unit 213, which may comprise an electric motor. The electronic transmission unit 213 is electrically coupled to a throttle control unit 240, which in turn is electrically coupled to a control panel 220. A selection on the control panel 220 electrically connects the throttle control unit 240 to the electronic transmission unit 213, such that when the throttle control unit 240 is depressed, the electronic transmission unit 213 is activated. The electronic transmission unit 220 is also mechanically coupled to an axle 217. Activating the electronic transmission unit 213 causes the axle 217 to rotate, which in turn causes wheels which are secured to the axle 217 to rotate, propelling the vehicle 210 when it is on a riding surface. The control panel 220 may comprise a forward selection and a reverse selection to allow for forward and reverse motions by the electric vehicle 210. The electronic transmission unit 220 may be removably coupled to a power source 222.

Any number of a plurality of stylistically different interchangeable vehicle body modules, such as vehicle body module 214, may also be removably secured to the chassis 212. In FIG. 7, the body module 214 is shown as being comprised of a single piece, however the vehicle body module 214 can be comprised of separate body module sections such as a front body module, a rear body module, a left side body module, and a right side body module, each of which may be removably coupled to the chassis 212. In addition, vehicle accessories for each of the various body styles may be secured to the vehicle body module 2.14 or the chassis 212 so that the electric vehicle 210 more closely resembles the vehicle type to which it is intended to depict. Also, as is described for the foot-to-floor vehicle, the vehicle body module 214 and vehicle accessories for the electric vehicle 210 from different body types may be combined on the same chassis 212 to form a hybrid electric vehicle having, for instance an electric vehicle 210 front end which resembles a sports car and an electric vehicle 210 back end which resembles a truck.

As in the foot-to-floor model, a vast array of stylistically different interchangeable vehicle body modules, such as vehicle body module 214 and vehicle accessories are contemplated for the electric vehicle 210 of the present invention, such as Indy Cars, Stock Cars, Sports Utility Vehicles, Jeeps®, Police Cars, Fire Trucks, Emergency Vehicles, licensed designs such as, Bentleys®, Ferraris®, Corvettes®, and a Porsches® as well as other body styles and designs. An example embodiment of an assembled electric vehicle 210 is shown in FIG. 8, in this case the electric vehicle 210 resembles an Indy Car.

A forth model of the toy vehicle 10 of the present invention is a gas toy vehicle model. The gas vehicle may be constructed similarly to the electric vehicle 210 in all respects, an exception being that the gas vehicle comprises a transmission unit that is gas powered rather than electrically driven.

FIG. 9 shows a garage 310 designed to store the various interchangeable toy vehicle body modules and vehicle accessories and to provide a work surface for assembling the various toy vehicles. The garage 310 comprises a top portion 311 having adjustable wall pegs or similar structures. Various vehicle accessories such as wheel covers 70, tires 68, and vehicle body modules 16 and 18, among others, may be hung on the adjustable wall pegs. In addition, the garage 310 may contain flip-down storage bins 312 and pull-out drawers 313, which may be used to store vehicle components or assembly tools. The garage 310 may also comprise a work table 314 which may be used for displaying vehicle accessories, such as engine 34, or as a work surface for assembling the toy vehicle 10. In one example, the work table 314 is recessed and comprises a gripping surface, such as a rubber material. The garage 310 may also comprise addition work surface areas, such as a fold-down work surface 315, which may be pivotally secured to the garage 310. In one instance, the garage 310 is supported by wheels 317 and the fold-down work surface 315 comprises a tow handle 316 such that the wheels 317 can be rotated to move the garage 310 when a pulling force or a pushing force is applied to the tow handle 316. The garage 310 may be constructed from a material such as a blow molded plastic material, an injection molded plastic, such as ABS plastic, a machined plastic, such as ABS plastic or a machined metal such as aluminum or stainless steel.

Although the present invention has been described and illustrated with respect to a preferred embodiment thereof, it is to be understood that the invention is not to be limited since changes and modifications are within the intended scope of the invention as hereinafter claimed.

What is claimed is:

1. A toy vehicle kit comprising:
   a vehicle chassis having at least one attachment location;
   a plurality of stylistically different interchangeable vehicle body modules having an attachment mechanism for removably securing the body module to the attachment location of the vehicle chassis; and
   a pedal transmission unit secured to the chassis and comprising a foot pedal assembly, wherein a movement of the foot pedal assembly causes the vehicle to be propelled when the vehicle is on a surface,
   wherein each of the plurality of body modules comprises a plurality of interchangeable front body modules and a plurality of interchangeable rear body modules.

2. The toy vehicle of claim 1, wherein the attachment location and the attachment mechanism include means for forming a press fit coupling between the vehicle chassis and the body module.

3. The toy vehicle of claim 1, wherein each of the plurality of stylistically different interchangeable front and rear body modules are structured to allow any combination of the plurality of stylistically different interchangeable front and rear body modules to be assembled onto the chassis.

4. The toy vehicle of claim 1, further comprising a steering assembly attached to the vehicle chassis and also attached to a front axle, such that movements of the steering assembly cause corresponding movements of the front axle for controlling a direction of motion of the vehicle.

5. The toy vehicle of claim 1, wherein said one of a plurality of stylistically different interchangeable vehicle body modules is comprised of a plastic material.

6. A toy vehicle kit comprising:
   a vehicle chassis having at least one attachment location;
   one of a plurality of stylistically different interchangeable vehicle body modules having an attachment mechanism for removably securing the body module to the attachment location of the vehicle chassis, wherein each of the plurality of body modules comprises a plurality of interchangeable front body modules and a plurality of interchangeable rear body modules; and
   a pedal transmission unit secured to the chassis and further connected to an axle having wheels, wherein a rotation of a foot pedal assembly of the pedal transmission unit causes the wheels of the axle to rotate, such that the vehicle is propelled when the vehicle is on a riding surface.

7. The toy vehicle of claim 6, wherein the attachment location and the attachment mechanism include means for forming a press fit coupling between the vehicle chassis and the body module.

8. The toy vehicle of claim 6, wherein each of the plurality of stylistically different interchangeable front and rear body modules are structured to allow any combination of the plurality of stylistically different interchangeable front and rear body modules to be assembled onto the chassis.

9. The toy vehicle of claim 6, further comprising a steering assembly attached to the vehicle chassis and also attached to a front axle, such that movements of the steering assembly cause corresponding movements of the front axle for controlling a direction of motion of the vehicle.

10. The toy vehicle of claim 6, wherein said interchangeable front and rear body modules are comprised of a plastic material.

* * * * *

UNITED STATES PATENT AND TRADEMARK OFFICE
CERTIFICATE OF CORRECTION

PATENT NO. : 7,055,889 B2 Page 1 of 1
APPLICATION NO. : 11/069266
DATED : June 6, 2006
INVENTOR(S) : Zhurong et al.

It is certified that error appears in the above-identified patent and that said Letters Patent is hereby corrected as shown below:

Column 2
Line 12, change "persons" to --person's--

Column 5
Line 18, change "bars," to --bars--
Line 36, change "limits" to --limit--

Column 8
Line 39, change "348" to --438--
Line 57, change "423" to --421--

Column 9
Line 1, change "Fig. 7" to --Fig. 8--
Line 25, change "348" to --438--
Line 28, change "348" to --438--

Column 12
Line 37, change "extend" to --extended--

Column 15
Line 5, change "anda" to --and a--

Column 16
Line 9, change "firs" to --first--

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,055,889 B2  Page 1 of 1
APPLICATION NO. : 11/069266
DATED : June 6, 2006
INVENTOR(S) : Mataja et al.

It is certified that error appears in the above-identified patent and that said Letters Patent is hereby corrected as shown below:

Column 2
Line 12, change "persons'" to --person's--

Column 5
Line 18, change "bars," to --bars--
Line 36, change "limits" to --limit--

Column 8
Line 39, change "348" to --438--
Line 57, change "423" to --421--

Column 9
Line 1, change "Fig. 7" to --Fig. 8--
Line 25, change "348" to --438--
Line 28, change "348" to --438--

Column 12
Line 37, change "extend" to --extended--

Column 15
Line 5, change "anda" to --and a--

Column 16
Line 9, change "firs" to --first--

Signed and Sealed this

Twenty-eighth Day of April, 2009

JOHN DOLL
*Acting Director of the United States Patent and Trademark Office*